Sept. 9, 1969   S. L. HANDMAN ET AL   3,465,718

TANK FOR CULTURE OF MARINE LIFE

Filed June 1, 1967

Inventors:
Stanley L. Handman,
Arthur Rosenberg,
by Thomson & Mrose
Attorneys

United States Patent Office 3,465,718
Patented Sept. 9, 1969

3,465,718
TANK FOR CULTURE OF MARINE LIFE
Stanley L. Handman, Peabody, and Arthur Rosenberg, Woburn, Mass. (both of 678 Washington St., Lynn, Mass. 01901)
Filed June 1, 1967, Ser. No. 642,799
Int. Cl. A01k 61/00, 63/00, 64/00
U.S. Cl. 119—2                                          4 Claims

ABSTRACT OF THE DISCLOSURE

An aquarium for culture of small marine animals and organisms, primarily for research purposes. The aquarium has a display tank and a water reservoir large enough to hold all the fluid in the system, so that separate aeration surfaces are provided in both the tank and the reservoir. A perforated shelf in the display tank supports a filter of calcareous gravel and calcite extending across the entire tank. The animals are placed directly on the filter or on a perforated plastic sheet over the filter.

Water is supplied at a controlled rate from the reservoir into an inlet box which has two openings, one above and one below the water level in the display tank. Water passes through the filter to a drain which discharges into the reservoir and has a control valve to regulate the rate of filtration. An overflow pipe extends to a desired maximum level of fluid in the tank. The drain and the overflow provide parallel flow paths from the tank to the reservoir, both being large enough to discharge the full rate of supply to the tank, so that the portion of the discharge which is filtered can be controlled from 0 to 100% without interfering with the maintenance of predetermined levels in the tank and the reservoir.

BACKGROUND OF THE INVENTION

This invention relates to aquariums for the culture and observation of small marine animals.

Storage tanks for live shellfish which are to be used for food have previously employed water filtration and circulation systems. These tanks, however, are intended merely to keep the animals alive for a relatively short time.

The aquarium here described is intended to keep small marine animals and organisms alive indefinitely, or for their normal life span, and permit them to propagate, for purposes of study and scientific research. The principal object of the invention is to provide an aquarium in which the natural living conditions of various marine animals can be simulated while displaying them for observation. Another object is to provide a circulation system which permits the turbulence of the water to be varied according to the needs of different kinds of animals. Other objects, advantages and novel features will be apparent from the following description.

SUMMARY

The aquarium here described has an open topped display tank with a perforated shelf covered by a filter of calcareous gravel and calcite, on which the animals may be placed. Below the display tank is a reservoir large enough to hold all the water in the system and leave an air gap above its normal water level. Water is continuously pumped from the reservoir to a supply box alongside the display tank at a selected rate of flow. The box has two outlets, one below and one above the water level in the display tank. Water returns to the reservoir through the filter and by way of a drain pipe and valve for controlling the portion of the draining water that is filtered. An overflow pipe to the reservoir is also provided to keep the water in the display tank at the required level by bypassing any of the flow which is not filtered.

The aquarium also has a refrigeration system for keeping the water at the optimum temperature for certain kinds of marine life.

BRIEF DESCRIPTION OF THE DRAWINGS

In the drawings illustrating the invention.

DESCRIPTION OF THE INVENTION

Figure 1:
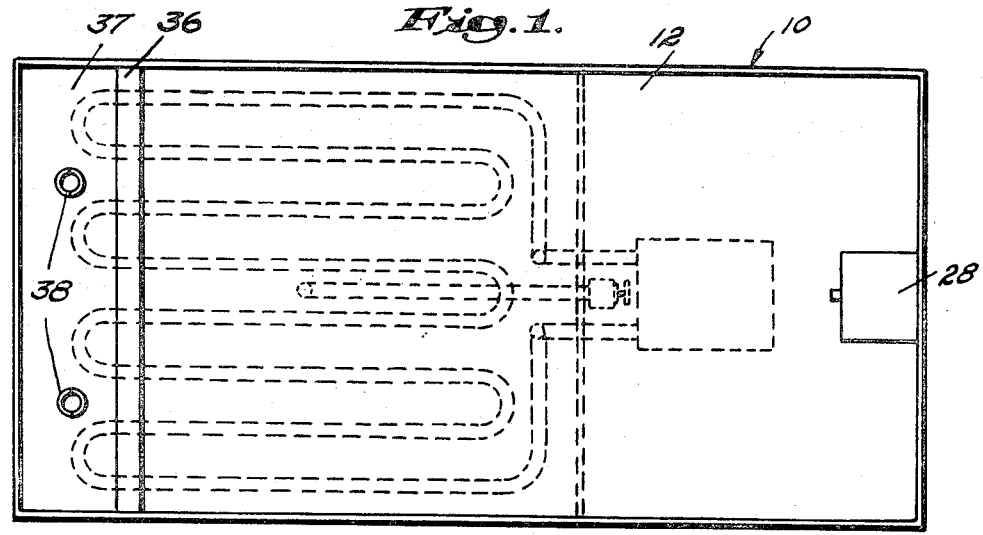
FIGURE 1 is a plan view of an aquarium constructed according to the invention.
Figure 2:
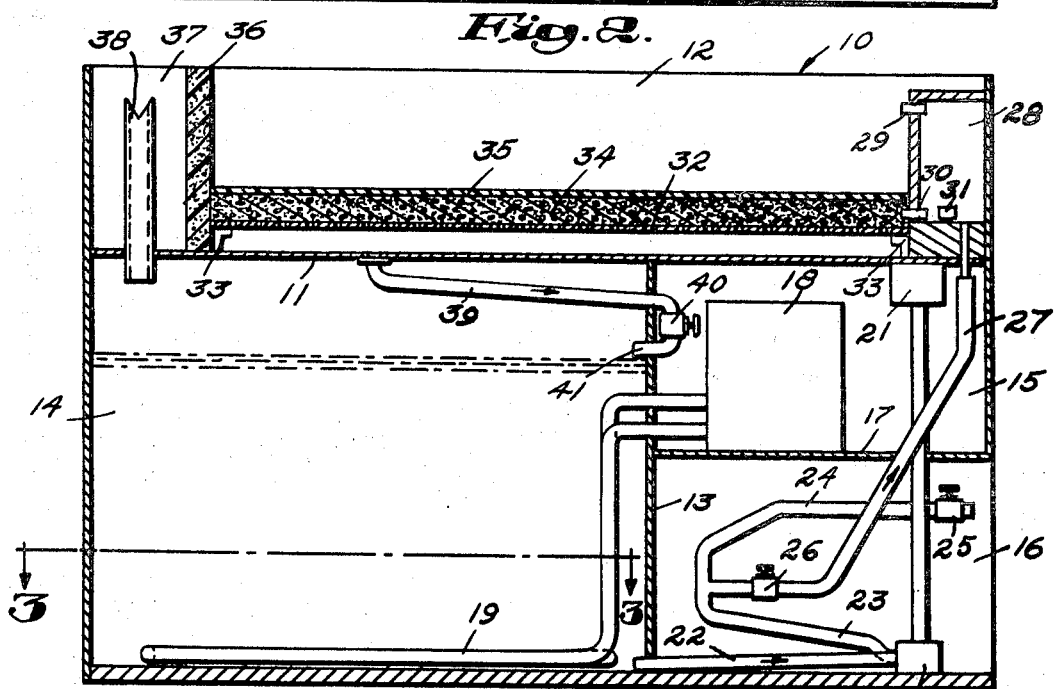
FIGURE 2 is a vertical cross-section through the aquarium.
Figure 3:
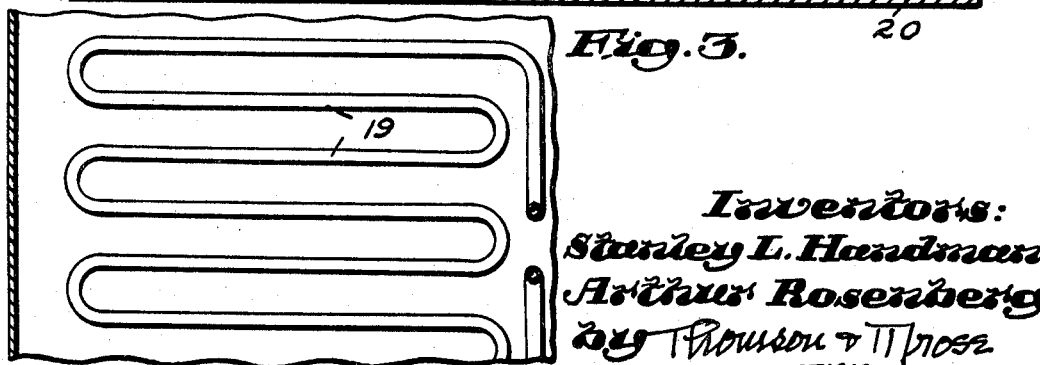
FIGURE 3 is a fragmentary cross-section taken along line 3—3 of FIGURE 2.

The parts of the aquarium are housed in an open topped rectangular housing generally indicated by the numeral 10. A watertight horizontal partition 11 divides the housing into upper and lower compartments. The upper compartment 12 is the display tank. A vertical watertight partition 13 in the lower compartment forms, with the walls of the housing, the water reservoir 14. On the other side of the partition are compartments 15 and 16 separated by a horizontal partition 17.

A refrigerating unit 18 is mounted on partition 17 and circulates refrigerant through coils 19 located in the water reservoir. The refrigerating unit is controlled by any suitable temperature control device (not shown). A pump 20, driven by a motor 21, is mounted in compartment 16. An intake pipe 22 leads from the reservoir to the pump. The pump discharges into a pipe 23 connected to a drain pipe 24 normally closed by a shut-off valve 25, and also through a control valve 26 to a supply pipe 27. The supply pipe leads to the interior of a supply box 28 disposed at one side of the display tank 12.

The supply box has an outlet 29 above the normal water level in the display tank, and a second outlet 30 below the water level. Either of these outlets may be closed, if desired, by a removable plug 31.

A removable shelf 32 of finely perforated Plexiglas is supported on brackets 33 in the display tank and extends over the entire area of the tank. A filter 34 of calcareous gravel and calcite is disposed on the shelf, and a finely perforated smooth plastic sheet 35 is laid over the filter. A polyurethane filter 36 is disposed across one end of the tank, creating, with the walls of the housing, an overflow chamber 37. Overflow pipes 38 are disposed in chamber 37. These pipes may be made in various lengths according to the water level which is to be maintained in the display tank.

A drain pipe 39 leads from the bottom of the display tank (partition 11), through a valve 40, to a discharge nozzle 41 which discharges horizontally into the reservoir 14 above the operating water level in the reservoir.

The aquarium is intended for culture of small marine animals, primarily to permit scientific study of their development and propagation and environmental factors influencing their existence. The animals which have been successfully maintained in the aquarium include crabs, shrimp, sea anemones, sponges, quahogs, mussels, starfish, sea urchins, clam worms, and various species of green and brown algae.

To operate the aquarium, the reservoir is filled with natural sea water, or fresh water mixed with a salt composition closely simulating the composition of sea water. The reservoir may be conveniently filled by filling the display tank and allowing the water to drain into the reservoir. The pump and refrigeration system are started and the latter is run until the water reaches the temperature appropriate for the particular type of animal for which the aquarium is to be used. The pump is run continuously while the aquarium is in use. Water is drawn from the reservoir and pumped to the supply box 28 and discharged into tank 12. The rate of flow into the tank may be controlled by valve 26. Water drains from tank 12 through the filter 34 and returns to the reservoir through pipe 39. Water also passes through filter 36 into chamber 37, and overflows into the reservoir through pipes 38 whenever the water level reaches the tops of the pipes.

By plugging either of the outlets 29 or 30, the degree of turbulence in the display tank can be controlled. When the aquarium is used for animals which normally live in quiet water, or could be easily dislodged by too rapid movement of water, the upper outlet 29 is plugged. The water entering through outlet 30 is distributed through filter 34 and creates very little disturbance in the tank. For animals which thrive in more turbulent water, the lower outlet may be plugged so that all the water enters the tank through the upper outlet 29, which discharges above the surface.

By adjusting the flow control valve 40, the proportion of water flowing through filter 34 can be controlled. When the valve is closed, all the water passes through filter 36 and returns to the reservoir through the overflow pipes 38. When the valve is fully open, all the water returns to the reservoir through filter 34 and drain 39.

In addition to providing the filtration, the calcite and calcareous gravel filter 34 acts as a matrix for bacteria which break down the toxic ammonia waste products of the animals in the tank into relatively harmless nitrates. When run in with a small animal load, this filter creates a biological balance in the system. The calcite also serves as a large reserve of soluble alkali which buffers the water and keeps the pH within the range of that of natural sea water.

Oxygenation is provided by two air to water surfaces, one in the display tank, and one in the reservoir. The return water also passes through an air gap in the reservoir. The stream from the upper outlet, when used, provides another cascading stream. An oxygen content approaching that of natural sea water can thus be maintained.

The plastic sheet 35 is used for animals which normally dwell on smooth surfaces. When the aquarium is used for other animals, the sheet 35 may be removed and the animals placed directly on the filter 34.

What is claimed is:

1. An aquarium for displaying and maintaining marine animals in a predetermined volume of recirculating fluid medium, comprising:
    a display fluid tank for containing the animals and providing a free surface for aerating the fluid; a fluid reservoir whose volume is at least equal to the volume of said tank for maintaining a second free surface for aeration of fluid in addition to that in the tank;
    a water circulation system including a pump and flow control means arranged to draw fluid from said reservoir and deliver it to said tank for recirculation through the aquarium at a predetermined rate of flow;
    a drain and a flow control valve communicating the bottom of said tank with said reservoir;
    a filter disposed in said tank and forming the sole fluid communication path between said tank and said drain;
    an overflow pipe having an inlet extending to a desired maximum free surface level in said tank, bypassing said filter and said drain, and communicating with said reservoir, said overflow pipe providing a cross-sectional area of flow large enough to drain fluid accumulated to a level higher than said inlet from said tank at a rate at least equal to said predetermined rate of recirculating flow, to maintain the fluid level substantially at the level of said inlet even when said flow control valve is closed;
    said drain providing a maximum cross-sectional area of flow at least large enough, when said flow control valve is fully open, to drain a flow from said tank through said filter at a rate at least equal to said predetermined rate of flow, thereby diverting flow from said overflow pipe and filtering the entire discharge from said tank, said flow control valve being adjustable to control the division of flow between the parallel paths through said overflow pipe and said drain, whereby the proportion of said recirculating flow which is filtered may be adjusted without altering the levels of the free surfaces in said tank and said reservoir.

2. An aquarium as recited in claim 1, together with a supply box disposed adjacent to said tank, said supply box receiving the flow from said water circulation system and having upper and lower outlets into said tank.

3. An aquarium as recited in claim 2, in which said upper and lower outlets are above and below said inlet of said overflow pipe, respectively.

4. An aquarium as described in claim 1, having a removable plug for selectively closing either of said upper and lower outlets.

References Cited

UNITED STATES PATENTS

| | | | |
|---|---|---|---|
| 2,594,474 | 4/1952 | McGrath | 119—5 |
| 2,672,845 | 3/1954 | Schneithorst | 119—5 |
| 2,981,228 | 4/1961 | Brandano | 119—2 |
| 3,113,555 | 10/1963 | Overman | 119—5 |
| 3,135,238 | 6/1964 | Eyl | 119—5 |
| 3,146,195 | 8/1964 | Berardi | 210—169 |
| 3,179,084 | 4/1965 | Norris et al. | 119—5 |
| 3,374,771 | 3/1968 | Michie et al. | 119—5 |
| 3,377,991 | 4/1968 | Rubert | 119—5 |
| 3,387,587 | 6/1968 | Kelley et al. | 119—2 |

ALDRICH F. MEDBERY, Primary Examiner

U.S. Cl. X.R.

119—5